(12) United States Patent
Nikolov et al.

(10) Patent No.: US 11,592,646 B2
(45) Date of Patent: Feb. 28, 2023

(54) MECHANICALLY TUNABLE REFLECTIVE METAMIRROR OPTICAL DEVICE

(71) Applicant: University of Rochester, Rochester, NY (US)

(72) Inventors: Daniel Nikolov, Rochester, NY (US); Nick Vamivakas, Rochester, NY (US); Fei Cheng, Granger, IN (US); Aaron Bauer, Penfield, NY (US); Jannick P. Rolland, Seneca Falls, NY (US)

(73) Assignee: University of Rochester, Rochester, NY (US)

( * ) Notice: Subject to any disclaimer, the term of this patent is extended or adjusted under 35 U.S.C. 154(b) by 59 days.

(21) Appl. No.: 17/006,336

(22) Filed: Aug. 28, 2020

(65) Prior Publication Data

US 2021/0063683 A1 Mar. 4, 2021

Related U.S. Application Data

(60) Provisional application No. 62/894,159, filed on Aug. 30, 2019.

(51) Int. Cl.
*G02B 7/182* (2021.01)
*G02B 5/00* (2006.01)
*G02B 5/08* (2006.01)

(52) U.S. Cl.
CPC ............. *G02B 7/182* (2013.01); *G02B 5/008* (2013.01); *G02B 5/0875* (2013.01); *G02B 2207/101* (2013.01)

(58) Field of Classification Search
CPC ...... G02B 5/008; G02B 5/0875; G02B 7/182; G02B 2207/101

USPC .......................................................... 359/872
See application file for complete search history.

(56) References Cited

U.S. PATENT DOCUMENTS

| | | | |
|---|---|---|---|
| 8,921,789 B2 * | 12/2014 | Pryce ..................... B32B 15/04 | 250/338.1 |
| 10,371,951 B2 | 8/2019 | Rolland et al. | |
| 2011/0111545 A1 * | 5/2011 | Ei-Gamal ........... B81C 1/00063 | 257/E21.002 |

(Continued)

FOREIGN PATENT DOCUMENTS

WO    2016161175 A1    10/2016

OTHER PUBLICATIONS

Ee et al. (2016) "Tunable Metasurface and Flat Optical Zoom Lens on a Stretchable Substrate," Nano Letters 16(4): 2818-2823.

(Continued)

*Primary Examiner* — Ricky D Shafer
(74) *Attorney, Agent, or Firm* — Andrew J. Anderson, Esq.; Harter Secrest & Emery LLP

(57) ABSTRACT

A mechanically tunable reflective metamirror optical device for a targeted design optical wavelength includes a dynamically deformable substrate and a sub-wavelength periodic arrangement of patterned isolated gap surface plasmon (GSP) resonators positioned in or on the dynamically deformable substrate. The patterned isolated GSP resonators are movable relative to each other and comprise a patterned optically thin metal layer for the design wavelength, a patterned optically thick metal layer for the design wavelength, and a patterned insulator layer between the patterned optically thin and optically thick metal layers.

20 Claims, 8 Drawing Sheets

(56) References Cited

U.S. PATENT DOCUMENTS

| | | | | |
|---|---|---|---|---|
| 2012/0327502 A1* | 12/2012 | Zheludev | ............... | G02B 1/002 |
| | | | | 374/161 |
| 2016/0299270 A1* | 10/2016 | Kotov | .................. | G02B 5/1861 |
| 2016/0370568 A1* | 12/2016 | Toussaint | ................. | C03C 17/36 |
| 2017/0242163 A1* | 8/2017 | Aksyuk, IV | ........... | G02B 1/002 |
| 2018/0292644 A1 | 10/2018 | Kamali et al. | | |
| 2019/0296521 A1* | 9/2019 | Yun | ......................... | H01S 3/169 |
| 2020/0303828 A1* | 9/2020 | Urzhumov | ........... | H04B 7/0456 |

OTHER PUBLICATIONS

Kamali et al. (2016) "Highly tunable elastic dielectric metasurface lenses," Laser Photonics Rev. 10(6): 1002-1008.

Liu et al. (Oct. 2018) "Ultrathin van der Waals Metalenses," Nano Letters 18(11): 6961-6966.

Pors et al. (2013) "Broadband Focusing Flat Mirrors Based on Plasmonic Gradient Metasurfaces," Nano Letters, 13 (2): 829-834.

Pors et al. (2013) "Gap Plasmon-based metasurfaces for total control of reflected light," Scientific Reports 3(2155): 1-6.

Roy et al. (2018) "Dynamic metasurface lens based on MEMS technology," APL Photonics 3(2): 021302-1 through 021302-7.

* cited by examiner

FIG. 5A  FIG. 5C
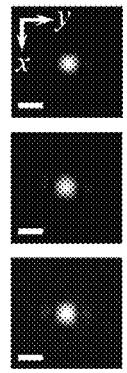
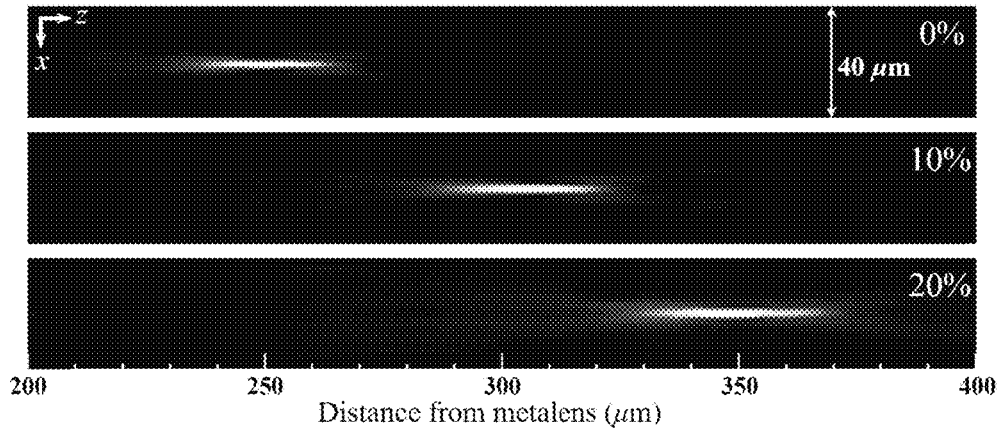
FIG. 5B  FIG. 5D  FIG. 5E
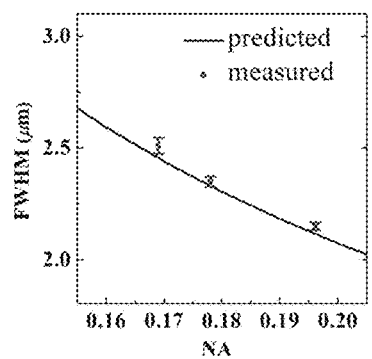
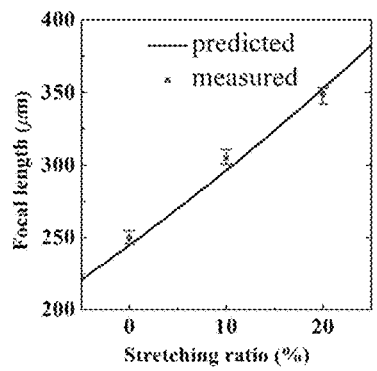
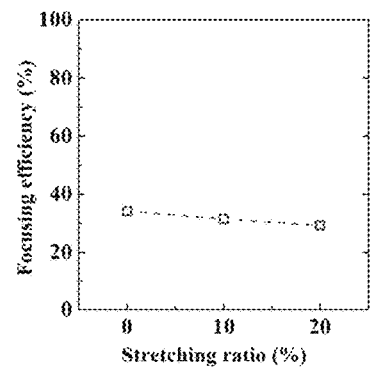

MECHANICALLY TUNABLE REFLECTIVE METAMIRROR OPTICAL DEVICE

REFERENCE TO RELATED APPLICATIONS

This application claims the benefit of U.S. Provisional Application No. 62/894,159 filed Aug. 30, 2019, the disclosure of which is incorporated by reference herein in its entirety.

STATEMENT REGARDING FEDERALLY SPONSORED RESEARCH OR DEVELOPMENT

This invention was made with government support under grant W911NF-16-1-0162 awarded by the Army Research Office. The government has certain rights in the invention.

BACKGROUND

The control of light using flat optics has attracted much recent attention due to unique technological opportunities presented by these devices. For example, optical metasurfaces, which are composed of rationally designed nanostructures (called e.g., artificial atoms, meta-atoms, meta-tokens, nanoantenna, etc.), are proposed to replace some of the conventional optical elements given their compact size and more importantly, the ability to produce spatially varying phase change (i.e. wavefront reshaping), amplitude modulation and polarization conversion of incident light over subwavelength dimensions (see, e.g., references 1-5 cited below). Based on these properties, several compact and flat optical elements have been demonstrated, such as refractive/diffractive gratings (see references 6-8 cited below), waveplates (see references 9, 10 cited below), vortex-beam generators (see references 11, 12 cited below) and meta-holograms (see references 13-16 cited below). Planar lenses (see references 17-23 cited below) based on metasurfaces, also referred to as metalenses, exhibit a number of advantages over their conventional counterparts not only in terms of size and weight, but also in creating cost-effective high numerical aperture (see references 22, 23 cited below), achromatic (see references 24, 25 cited below), multifunctional (see references 21, 26 cited below), and flexible lenses (see references 19, 20 cited below). A metamirror is a reflective optical device having a metasurface whose optical function can be custom-tailored by designing the local geometry of the subwavelength nanostructures patterned on the device.

The two-dimensional nature of metasurfaces may be integrated with dynamic components (e.g. elastomers, semiconductors, graphene, liquid crystal, phase change materials, etc.) for designing active devices, such as frequency-tunable metasurfaces (see references 27-37 cited below), electrically tunable modulators (see references 38-40 cited below), beam steering devices (see references 41-44 cited below) and holograms (see references 45, 46 cited below). Among the above active devices, transmissive tunable metalenses based on dynamic components have been demonstrated recently, including electrically-tunable metalenses (see references 47-49 cited below), phase-change material based metalens (see reference 50 cited below), elastic metalenses (see references 51-53 cited below) and Alvarez lens (see reference 54 cited below). One MEMS-integrated reflective metalens has also been described, capable of dynamic beam steering at mid-infrared wavelengths (see reference 55 cited below).

A reflection type, mechanically tunable metamirror optical device working in the visible has not yet been reported. Such a device may find application in a variety of applications such as flat optics, optical communications, and wearable consumer electronics such as augmented reality and virtual reality (AR/VR) hardware, among other applications.

SUMMARY

According to aspects illustrated herein, there is provided a mechanically tunable reflective metamirror optical device for a targeted design optical wavelength comprising: a dynamically deformable substrate; and a sub-wavelength periodic arrangement of patterned isolated gap surface plasmon (GSP) resonators positioned in or on the dynamically deformable substrate, wherein the patterned isolated GSP resonators are movable relative to each other and comprise a patterned optically thin metal layer for the design wavelength, a patterned optically thick metal layer for the design wavelength, and a patterned insulator layer between the patterned optically thin and optically thick metal layers.

BRIEF DESCRIPTION OF THE DRAWINGS

FIG. 5B is a graph showing measured FWHM values (red dots) extracted from FIG. 5A at the focal plane as a function of the numerical aperture (corresponding to different stretching ratios). The error bars are from a Gaussian fit of the FWHM as a function of the numerical aperture (NA). The theoretical diffraction limited spot size are also plotted as a comparison (black line).

FIG. 5C illustrates measured longitudinal beam intensity profiles of the metamirror for stretching ratios of 0 (top), 10% (middle) and 20% (bottom). The metamirror is located at z=0 (left side of images).

FIG. 5D is a graph showing the measured focal length (red dots) extracted from FIG. 5C and predicted focal lengths of the metamirror (black line) as a function of the stretching ratio. The error bars show ranges of focal distance where the intensity is larger than 90% of the peak value.

FIG. 5E is a graph showing the measured focusing efficiencies of the metamirror as a function of the stretching ratio.

DETAILED DESCRIPTION

We define a metamirror as a reflective optical device having a metasurface whose optical function can be custom-tailored by designing the local geometry of subwavelength (relative to a targeted design optical wavelength for the device) nanostructures patterned on the device. The disclosed metamirror optical devices are fabricated on a dynamically deformable substrate, such as a flexible, stretchable substrate, such that the nanostructures patterned on the device are movable relative to each other and the optical properties can be dynamically tuned by mechanical deformation of the substrate. When the device is illuminated with a source of chosen wavelength band, the light interacts with the subwavelength geometry of the nanostructures and the reflected wavefront can be arbitrarily defined by changing the relative locations of the subwavelength features. By mechanically stretching or otherwise dynamically deforming the substrate, the distance between the subwavelength nanostructure features can be changed and the reflected wavefront can be dynamically tuned. Furthermore, the nanostructure features may be fully submersed in and encapsulated by the substrate, or otherwise encapsulated by a protective layer, making the device mechanically and chemically robust.

In general, the present disclosure is applicable to the design of tunable reflective optical elements having reflective metasurfaces with dynamically movable nanostructure features. In various embodiments, the metamirror optical device may have, e.g., an optical function of a diffraction grating with a tunable grating spacing (i.e., a tunable reflective metagrating), or may have an optical function of an optically powered mirror with a tunable focal length (i.e., a tunable reflective metalens), or may have an optical function of an optical aberration generating reflective surface (i.e. a tunable reflective meta-aberration-generator) with a generally tunable phase (i.e., defined by a combination of basis functions (e.g. radial basis functions, NURBs, X-Y polynomials, Zernike polynomials, Q-polynomials, Chebyshev polynomials, other non-orthogonal or orthogonal polynomials over complex aperture shapes)).

Tunable Reflective Metalens Example

Figure 1:
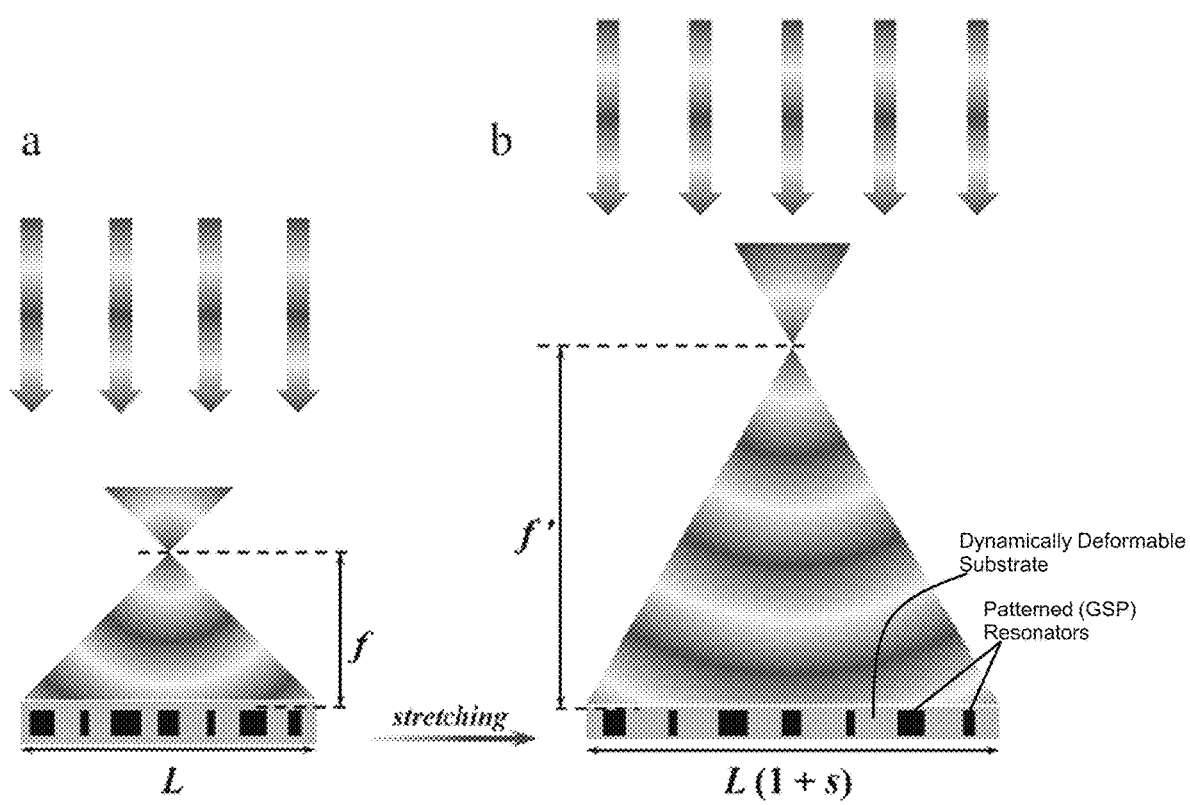
FIG. 1 schematically illustrate the working principle of a mechanically tunable reflection type metalens having a reflective metasurface encapsulated in a flexible polymer.

In a particular embodiment, a mechanically tunable, reflection type metalens (i.e., an optically powered metamirror) working in the visible (e.g., operating at a free-space wavelength of 670 nm), based on an ultrathin (e.g., ~λ/4 thick), gradient metasurface encapsulated in an elastic polymer is described. The focal length of the metamirror can be continuously changed by stretching the flexible substrate, as illustrated in FIG. 1. In part (a) of FIG. 1, the metamirror has a lateral size of L along one dimension and it focuses incident light backwards to a focal distance of f from the surface. Part (b) of FIG. 1 illustrates the metamirror's response after it is stretched by a ratio of s: the focal length of the metamirror under stretching is elongated to f'.

The disclosed tunable metamirrors more particularly employ isolated gap surface plasmon (GSP) resonators as the constituent element, which features a high reflective localized plasmonic resonance (see reference 56 cited below). While reflective metamirrors comprising GSP resonators as previously employed have typically comprised a patterned optically thin metal layer over an insulator layer and a continuous optically thick metallic ground plane layer, the metasurface employed in the present disclosed metamirrors comprises a subwavelength (for the design wavelength of the optical element) periodic arrangement of patterned isolated GSP resonators, wherein the patterned isolated GSP resonators comprise a patterned optically thin metal layer for the design wavelength, a patterned optically thick metal layer for the design wavelength, and a patterned insulator layer between the patterned optically thin and optically thick metal layers. The sectioning of the patterned optically thick metal layer of the GSP resonators encapsulated in the mechanically stretchable substrate facilitates stretching without sacrificing the requisite electromagnetic resonance.

An optically thin metal layer is a metal layer that is effectively transparent for radiation of a design wavelength. For silver metal layers, e.g., thickness of less than 40 nm (thinner than the skin depth of the metal) are effectively transparent for visible light at wavelengths from 400-750 nm, while thicker layers (thicker than the skin depth of the metal) are effectively reflective. The optically thin top metal layer of the stack, while optically thin for the design wavelength, is preferably at least 30 nm for robustness. The base layer is minimally optically thick for the design wavelength, but is preferably less than 130 nm for ease in fabrication or to optimize efficiency. Au, Al and other metals with high reflectivity in the visible may also be used for the metal layers, wherein appropriate thicknesses for such other metal layers may be employed to provide optically thin and optically thick metal layers for a targeted design optical wavelength.

The patterned insulator layer may be any materials conventionally used in forming gap surface plasmon (GSP) resonators, e.g., such as $SiO_2$ at conventional thicknesses (e.g., from 40-80 nm). Other insulator materials that may be used include, e.g., $MgF_2$, $CaF_2$, $Al_2O_3$, and other visible transparent, none absorption dielectric materials at appropriate thicknesses.

The GSP resonators are carefully positioned in or on a dynamically deformable substrate, and more preferably encapsulated in a mechanically stretchable substrate, such as polydimethylsiloxane (PDMS) substrate, or other transparent to visible, none absorbing, mechanical stretchable polymer or actuator. The mechanically stretchable substrate is typically much thicker than the total thickness of the GSP resonators (e.g., from about 200 to 300 nm thick) to provide protection and mechanical robustness, and uniform mechanical stretching.

By assuming that the neighboring resonators have no (or weak) coupling and their local phase discontinuity does not depend on the substrate deformation, a uniform stretching of the flexible substrate changes the relative position of the GSP resonators; as a result, the wavefront of reflected light can be adjusted locally depending on the position of these resonators, and the focal distance of the device can be tuned accordingly. Specifically, to realize a flat metamirror focusing a normally incident plane wave at a focal length f from the lens plane, one must impart the following hyperboloidal phase shift to each element of the metasurface: $\varphi(r)=k_0(\sqrt{r^2+f^2}-f)$, where $k_0$ is the free-space wave vector for a fixed wavelength and r is the radial coordinate of the element (see references 1, 57 cited below). Considering a stretching ratio of s applied for the element at a radial location r, the above local phase shift changes to the form $k_0(\sqrt{r^2(1+s)^2+f'^2}-f')$; meanwhile, we assume that the local phase response of this element does not change upon the substrate stretching. Under the paraxial approximation (see reference 58 cited below), the focal length f' is expected to vary quadratically with the stretching ratio: $f'=f(1+s)^2$, demonstrating a large focal length tuning range of the metamirror integrated with a flexible substrate (see references 48, 51, 52 cited below).

Figure 2A:
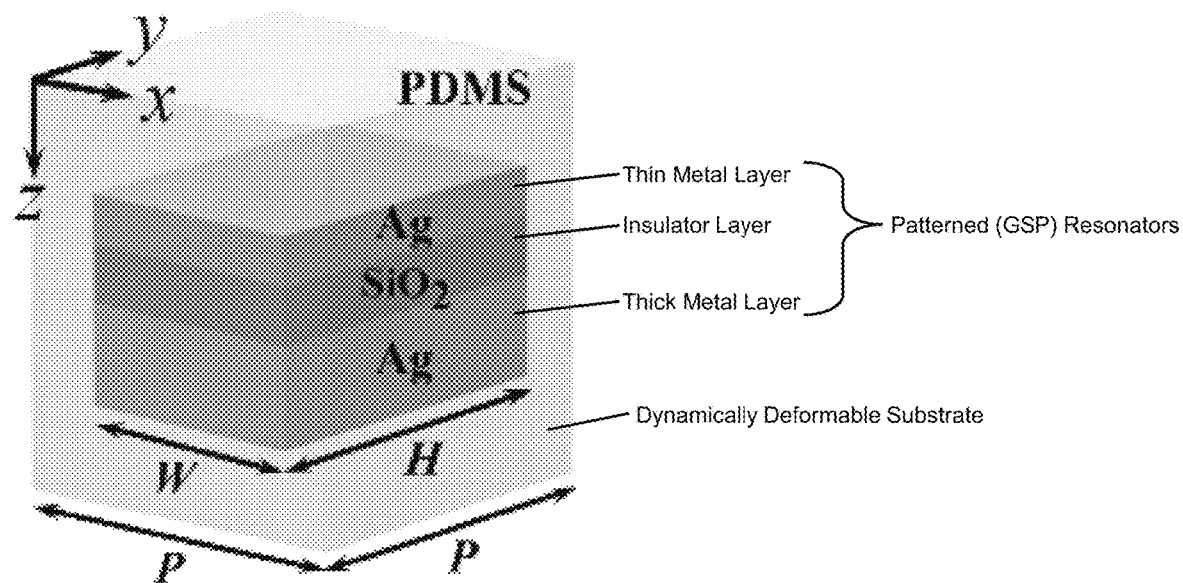
FIG. 2A schematically illustrates structure of the unit cell geometry of a patterned isolated gap surface plasmon (GSP) resonator encapsulated in polydimethylsiloxane (PDMS) used in an embodiment of the disclosure.
Figure 2B:
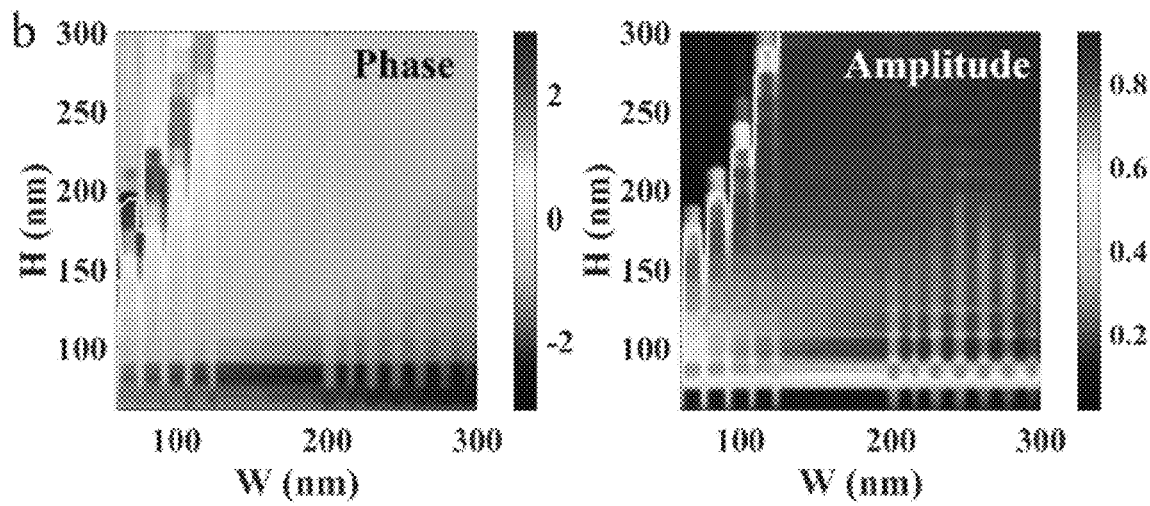
FIG. 2B illustrates the simulated complex reflection coefficients for a unit cell under normal incident light (E field along y axis, $\lambda=670$ nm), with the left panel showing the contour map of reflected phase $\phi=\arg(r)$ as a function of the nanoantenna lateral dimensions from 60 to 300 nm and the right panel showing the contour map of reflectance |r| as a function of the nanoantenna lateral dimensions.

Following the above method, a tunable metamirror using the high-reflective GSP resonators as the building elements for linearly polarized illumination at 670 nm is presented in this embodiment. The schematic structure of the unit cell geometry is shown in FIG. 2A, which contains an Ag—$SiO_2$—Ag triple layer GSP resonator structure encapsulated in PDMS. The thicknesses of the top Ag layer, the $SiO_2$ dielectric spacer layer and the Ag ground plane are 30 nm, 50 nm and 75 nm, respectively. The thicknesses for all three layers are determined by optimizing the complex reflection coefficients of the GSP resonator within the parameter space shown in FIG. 2B. Meanwhile, the total thickness of the GSP resonator is controlled for the ease of pattern transfer during the fabrication process as discussed below. The top Ag surface is ~200 nm below the top PDMS surface. The complex reflection coefficient $r=|r|e^{i\angle r}$ of the element unit is evaluated numerically by running a parametric sweep of the lateral dimensions of the stack (ranging from 60 to 300 nm in a step of 4 nm), and the simulated complex reflection coefficients for a unit cell under normal incident light (E field along y axis, $\lambda$=670 nm) are shown in FIG. 2B (Left panel: the contour map of reflected phase $\angle r$ as a function of the nanoantenna lateral dimensions from 60 to 300 nm; Right panel: the contour map of reflectance $|r|$ as a function of the nanoantenna lateral dimensions). The lattice pitch is chosen to be 330 nm with no stretching and it remains non-diffractive under all stretching ratios of interest. As shown in the left panel of FIG. 2B, a full $2\pi$ phase shift is covered within the parameter space, and as shown in the right panel of FIG. 2B, except for a narrow region of dimensions (stack width and height<100 nm), a high reflection amplitude ($|r|$>80%) of the element unit is maintained.

The unit elements chosen from the parameter space are then arranged periodically with the pitch fixed at 330 nm to construct a 9.9×9.9 $\mu m^2$ square metamirror with a designed focal length of 3.75 $\mu m$ (corresponding to a numerical aperture of ~0.8). To mitigate the calculation burden, a moderate-sized metamirror with a large numerical aperture that yields a shorter focal length was used for the numerical demonstration of focal length tunability. Note that the design is scalable for both different pattern sizes and numerical apertures.

Figure 2C:
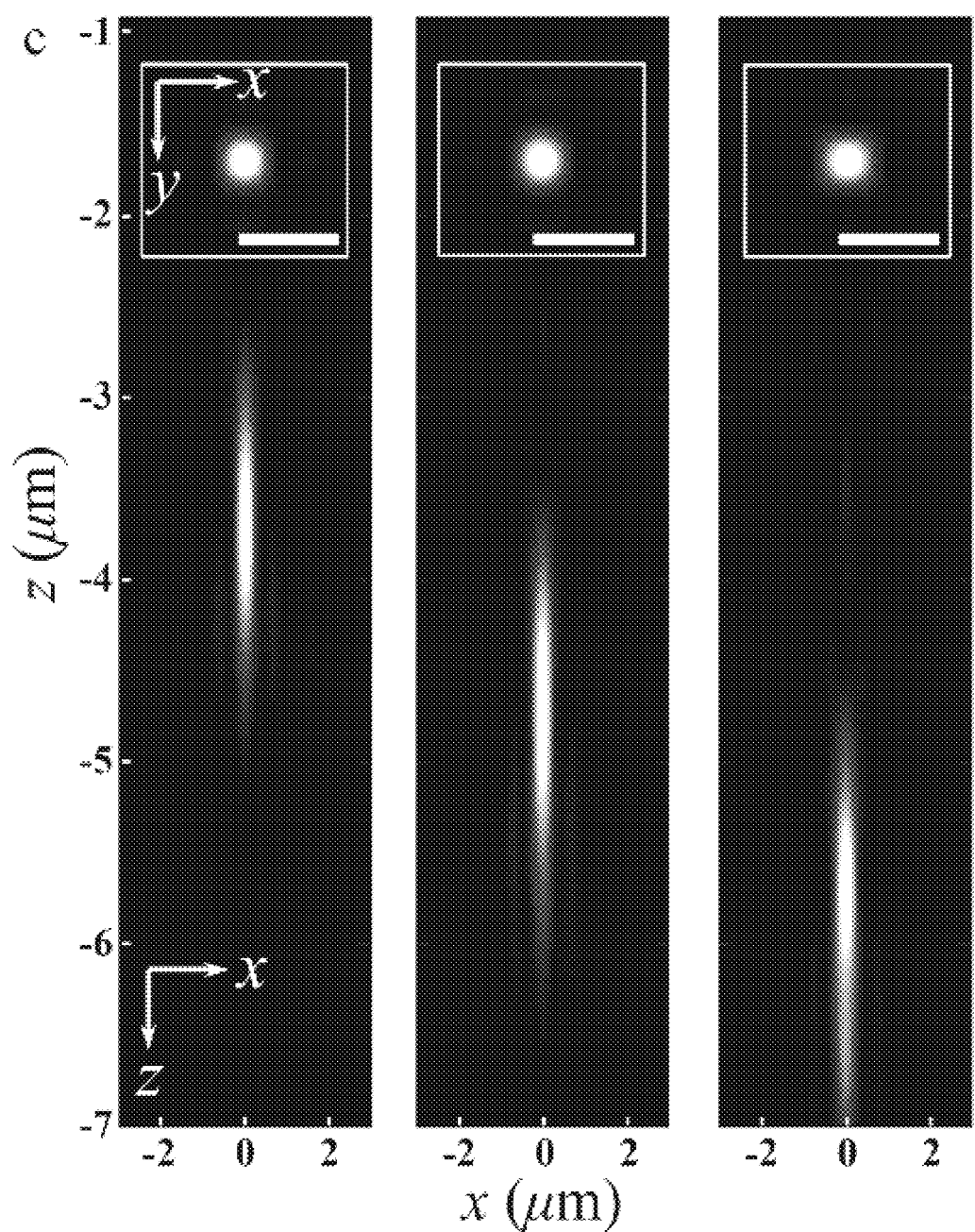
FIG. 2C illustrates calculated profiles of reflected electric field intensity within the x-z plane for a 9.9×9.9 $\mu m^2$ (unstretched) metamirror located at z=0 (above the figure) and stretched by 0%, 10% and 20% within x-y plane from left to right panels, respectively. The calculated electric field intensity at the focal plane (white dashed lines indicated on the x-z planes) are also shown in the inset of each panel. Scale bar: 1 µm.
Figure 2D:
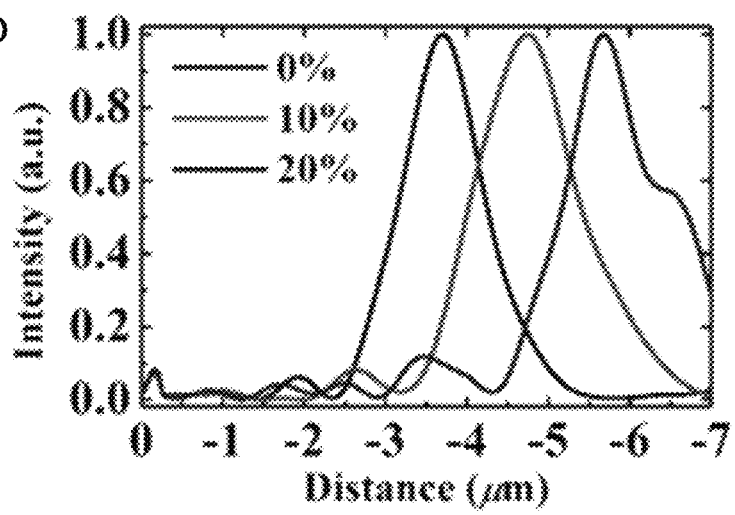
FIG. 2D is a graph illustrating the electric field intensity distribution along the optical axis under different stretching ratios.
Figure 2E:
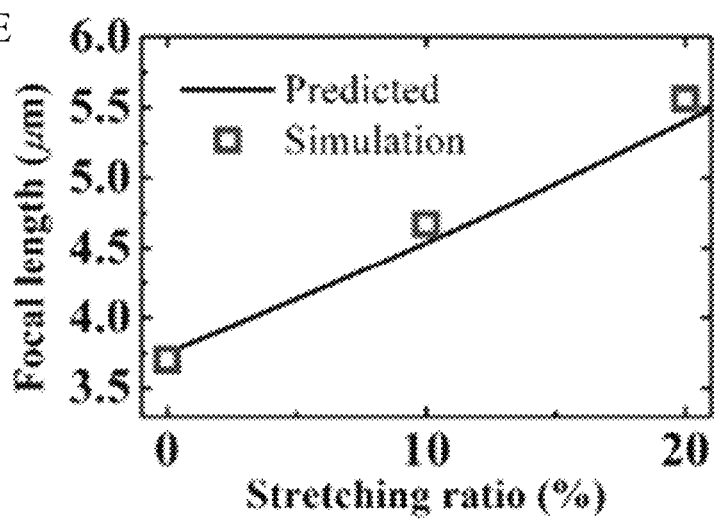
FIG. 2E is a graph illustrating simulated focal lengths of the metamirror (red square) extracted from FIG. 2D as a function of the stretching ratio. The predicted focal length is also displayed as the black line.
Figure 2F:
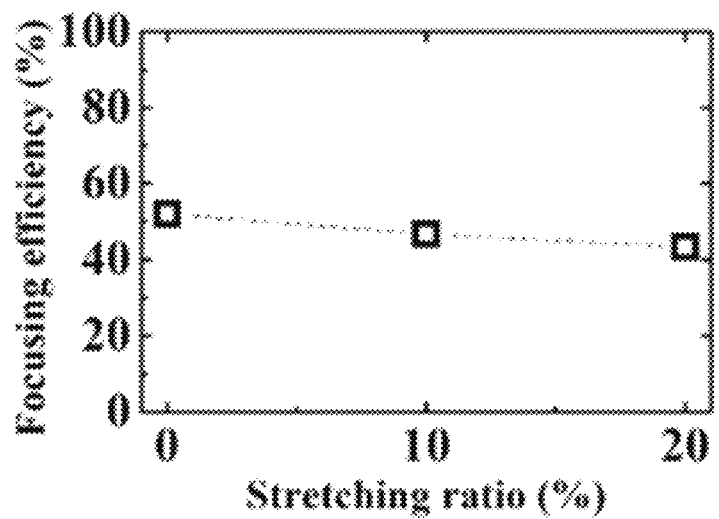
FIG. 2F is a graph illustrating simulated focusing efficiencies of the metamirror as a function of the stretching ratio.

The flat metamirror device is constructed by discretizing and sampling its hyperboloidal phase profile $\varphi$ using the above GSP resonators placed at vertices of a square lattice. The GSP resonator geometry at each lattice site is found by minimizing the reflection error between the desired unity-amplitude phase profile $e^{i\varphi}$ and complex reflection coefficient of the resonator: $\Delta R=|e^{i\varphi}-|r|e^{i\angle r}|$. According to FIG. 2B, the phase of reflection coefficient $\angle r$ can always be matched to $\varphi$: $\Delta R=|e^{i\varphi}-|r|e^{i\angle r}|\approx(1-|r|)e^{i\varphi}$, so the reflection error is minimized in our algorithm by first finding a group of resonators having the desired phase value and then selecting one with highest reflection amplitude. The performance of the designed metamirror is tested under different stretching ratios from 0 to 10% and 20%. The lattice pitch is linearly scaled with the stretching ratio in both lateral dimensions. The light source is placed in the −z space, injecting a plane wave on the device (at z=0) along the z direction. As can be seen from FIG. 2C (calculated profiles of reflected electric field intensity within the x-z plane with metamirror located at z=0 (above the figure) and stretched by 0%, 10% and 20% within x-y plane from left to right panels, respectively), the change of reflected light focusing lengths is clearly identified within the longitudinal electric field intensity map (x-z plane). The calculated electric field intensity at the focal plane (white dashed lines indicated on the x-z planes) are also shown in the inset of each panel (Scale bar: 1 $\mu m$). The electric field intensity distribution profile along the optical axis (x=0) under different stretching ratios is plotted in FIG. 2D and the calculated focal lengths of the metamirror extracted from FIG. 2D as a function of the stretching ratio are summarized in FIG. 2E. The predicted focal length is also displayed. The focal length increases from z=3.7 $\mu m$ (no stretch) to z=4.7 $\mu m$ (10% stretching ratio) and z=5.6 $\mu m$ (20% stretching ratio), respectively, which agrees well with the predicted values by $f'=f(1+s)^2$ and confirms a large focal distance tunability of the device. The focusing efficiencies of the metamirror as a function of the stretching ratio are calculated by the ratio of the power in focus (integrated within the focal plane) to the power of incident plane wave (integrated over the incident plane), as shown in FIG. 2F. 52% focusing efficiency is obtained for the relaxed state, and it decreases slightly to 47% and 43% with the stretching ratio of 10% and 20%. The tunable range of the metamirror's focal length can be lengthened upon further stretching the PDMS substrate. However, there is a stretching limit beyond which the metamirror performance may degrade appreciably. According to Seyedeh et al, for a perfect phase reconstruction and the elimination of higher order diffractions, the lattice constant of a metalens or a metamirror under all stretching ratios should remain non-diffractive and satisfies the Nyquist sampling criterion[51]. For the parameters employed in our work, the metamirror can be stretched up to 30% based on the above criterion.

Figure 3A:
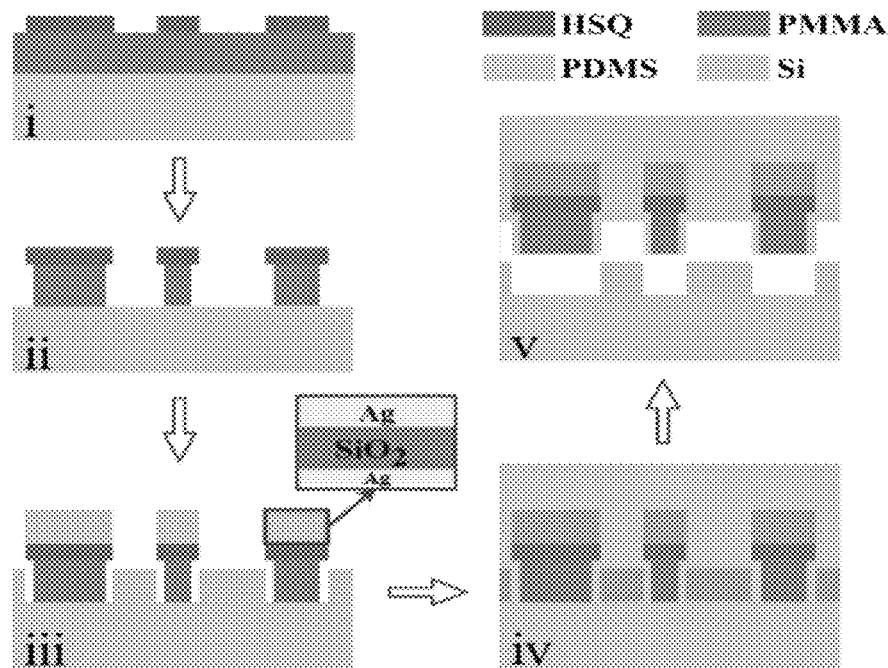
FIG. 3A is a schematic illustration showing the fabrication process of a tunable metamirror encapsulated in PDMS in accordance with an embodiment of the disclosure.
Figure 3B:
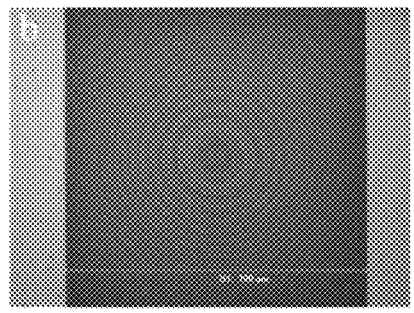
FIG. 3B is an optical image of a 100×100 µm² metamirror fabricated on the Si wafer corresponding to step iii of FIG. 3A (before PDMS casting).
Figure 3D:
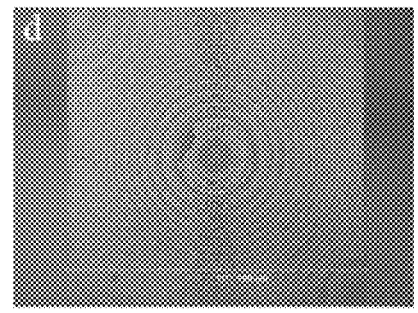
FIG. 3D is an optical image of the same metamirror as in FIG. 3B transferred to the PDMS film corresponding to step v of FIG. 3A.
Figure 3C:
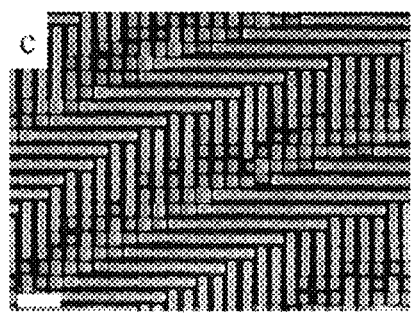
FIG. 3C is an SEM image taken from the same metamirror on the Si wafer as in FIG. 3B corresponding to step iii (before PDMS casting). Scale bar: 1 µm.
Figure 3E:
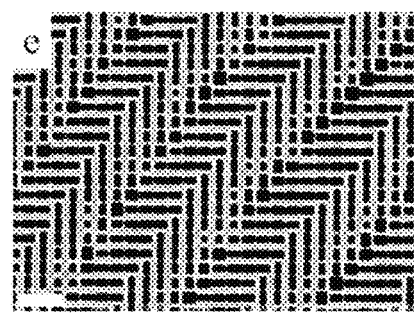
FIG. 3E is an SEM image taken from the complementary structure of the metamirror on the Si wafer after the transfer process in step v of FIG. 3A. Scale bar: 1 μm.

To verify the above design for wavefront engineering in applications, a 100×100 μm$^2$ size tunable metamirror is fabricated on a flexible substrate with a designed focal length of 245 μm (NA~0.2). The fabrication process is illustrated schematically in FIG. 3A. Here we adopted a "lift-off" method developed by Ee et al (see reference 52 cited below) to obtain the positive patterns encapsulated in PDMS. For the ease of transfer of positive patterns from a handing wafer to the flexible PDMS, we first create an under-cut bilayer resist stack, i.e., negative hydrogen silsesquioxane (HSQ) resist on top of poly(methylmethacrylate) (PMMA) resist, on a 4-inch Si wafer by electron beam lithography (EBL) followed by $O_2$ plasma etching of PMMA (step i and ii) (see reference 59 cited below). First, a bilayer resist HSQ/PMMA is applied on a 4-inch wafer by spin coating. The thickness of top negative HSQ layer (Dow Corning XR-1541, 6% in methylisobutylketone) is ~80 nm at 5000 rpm for 1 minute and the bottom PMMA layer (MicroChem, 950K molecular weight, 4% in anisole) ~200 nm at 3000 rpm for 1 minute. The designed metamirror pattern is then exposed on the negative HSQ layer using EBL (JEOL-9500, dose ~1100 μC/cm$^2$ at 100 kV accelerating voltage). The HSQ resist is developed in AZ 300 MIF (2.38% TMAH) for 90 s and rinsed in DI water for 60 s. The metamirror pattern is then transferred to the bottom PMMA layer using $O_2$ plasma etching (South Bay Technology, RIE-2000) for 2 minutes with the pressure 50 mTorr and oxygen plasma energy 50 W. The PMMA pillars underneath the HSQ layer serve as a sacrificial layer for the later transfer of the materials on top of HSQ using PDMS. Then (step iii) we deposited Ag (30 nm), $SiO_2$ (50 nm) and Ag (75 nm) layers successively on the bilayer resist stack by e-beam evaporation (PVD-75 Lesker, the base vacuum is 6×10$^{-7}$ Torr and evaporation rate is kept at 0.3 Å/s for both Ag and $SiO_2$). Note that the bottom PMMA sacrificial layer should be thicker than the total thickness of the deposited triple layer. The corresponding structure of the metamirror fabricated on the Si wafer corresponding to step iii (before PDMS casting) under optical microscope and scanning electron microscope (SEM) is shown in FIGS. 3B and 3C. At last, the PDMS (silicone elastomer base mixed with curing agent with a ratio of 10:1, Dow SYLGARD) colloid is cast to the pattern by spin coating (~1000 rpm for 5 minutes) and then stripped from the Si wafer after it is cured at 85° C. for 2 hours (step iv and v). The deposited triple layer stacks on top of HSQ/PMMA pillars are all transferred to the PDMS film, as shown in FIG. 3D (optical image taken on PDMS after stripping and flipped over onto a carrier chip corresponding to step v), with the complimentary part of deposited stack stays on the Si wafer, as can be seen from the SEM image shown in FIG. 3E. Scale bar for FIGS. 3C and 3E is 1 μm. The $O_2$ plasma etching performed before Ag deposition increases the adhesion of Ag to the Si wafer, which guarantees the successful transfer of the metamirror from the Si wafer to the PDMS film. Besides its ease of fabrication, the Ag nanoantennas are fully embedded in the PDMS film by this technique, making the fabricated metamirror mechanically and chemically robust.

Figure 4A:
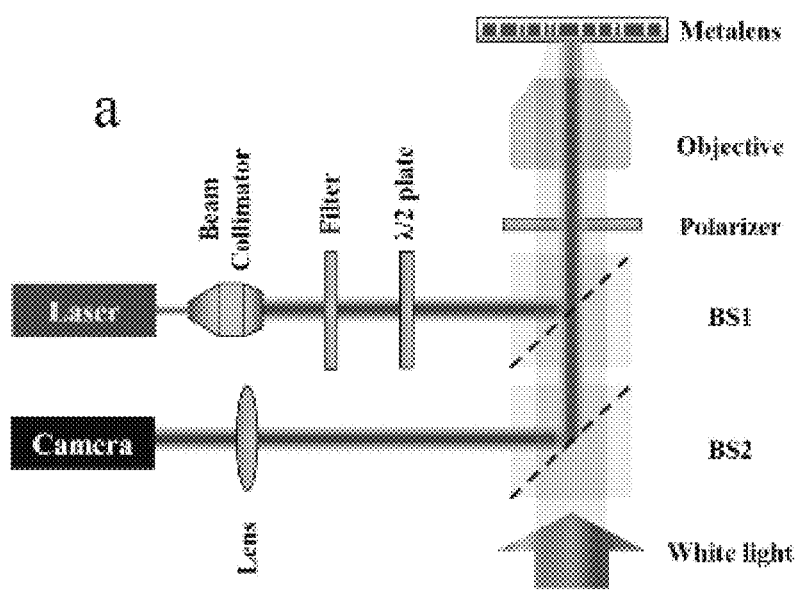
FIG. 4A is a schematic diagram of the experimental setup for testing the optical response of the fabricated metamirror in an embodiment of the disclosure.
Figure 4B:
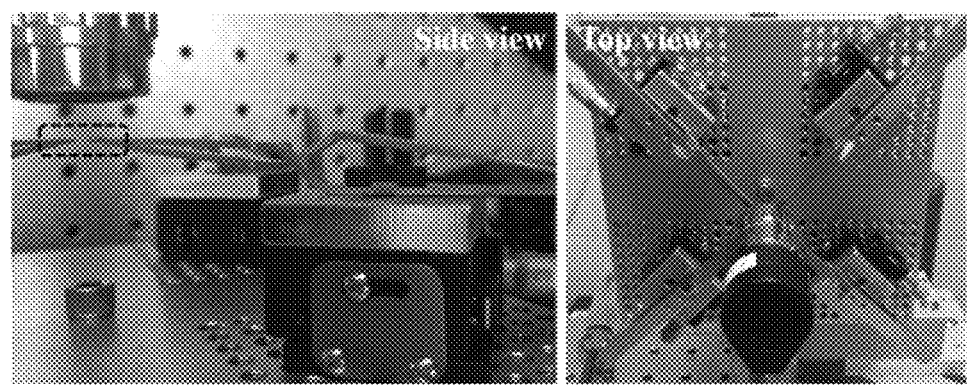
FIG. 4B shows the side view and top view of a custom-built sample stage holding the stretched PDMS film in accordance with an embodiment of the disclosure.
Figure 4C:
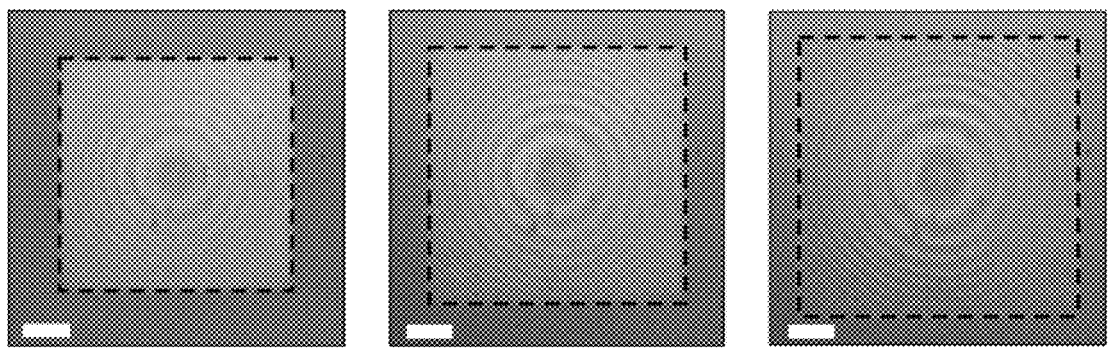
FIG. 4C shows optical microscope images of the metamirror isotropically stretched by 0, 10% and 20%, respectively (left to right) in accordance with an embodiment of the disclosure. The dashed square shows the outline of the metamirror and the scale bar is 20 μm FIG. 5A illustrate measured beam intensity profiles taken at their respective focal planes (x-y plane) for different stretching ratios of 0 (top), 10% (middle) and 20% (bottom) for the fabricated metamirror in an embodiment of the disclosure. Scale bar: 5 μm.

We employ an optical setup schematically shown in FIG. 4A to test the optical response of the fabricated metamirror. A supercontinuum, intensity-tunable fiber laser (WhiteLase-micro 10-1770 by Fianium) combined with a 670 nm bandpass filter and a beam expander is used as the light source, producing a collimated Gaussian beam through a 10× microscope objective (Mitutoyo, NA=0.28, achromatic with a focal length of 200 mm) which focuses the laser beam onto the sample. The reflected focusing beam is collected using the same objective and directed through a beam splitter, a focusing lens and mirrors to a CCD camera (WAT-902B by Watec). An additional white light illumination is used for monitoring the pattern size under stretching. As shown in side view (left panel) and top view (right panel) in FIG. 4B, a custom-built sample holder, which has four self-locking tweezer clamps mounted on four identical linear translation stages, is used to hold and stretch the PDMS film. The black dashed box indicates the location of the sample. The metamirror pattern, which is monitored by the objective, can be isotopically and uniformly stretched by moving carefully the four tweezers holding the four corners of the PDMS film. The sample holder is installed on a XYZ translation stage with standard micrometers. The amount of isotropic stretching of the metamirror can thus be monitored during the measurement. FIG. 4C shows optical microscope images of the metamirror isotropically stretched by 0, 10% and 20%, respectively (left to right). The dashed squares show the outlines of the metamirror and the scale bar is 20 μm.

By removing the fabricated device longitudinally from the objective (twice of the designed focal lengths) (see references 60 cited below), we observe that the metamirror focuses incident light similarly to a positive lens. Meanwhile, as the PDMS film is stretched gradually, its focal plane is pushed further away from the metamirror, indicating an enlarged focal distance. Optical images of the focal plane are captured at different focal distances from the metamirror and are shown in FIG. 5A (measured beam intensity profiles taken at their respective focal planes (x-y plane) for different stretching ratios of 0 (top), 10% (middle) and 20% (bottom); Scale bar: 5 μm). The corresponding cross-sectional line profiles are analyzed and presented in FIG. 5B (measured full width at half maximum (FWHM) values (red dots) extracted from FIG. 5A at the focal plane as a function of the numerical aperture (corresponding to different stretching ratios). The error bars are from a Gaussian fit of the FWHM as a function of the numerical aperture NA. The theoretical diffraction limited spot size are also plotted as a comparison (black line). As expect, the extracted (FWHM) of focal spot increases with the stretching ratio due to a decreased numerical aperture of the metamirror. However, the extracted FWHM values (red squares) matches with their diffraction limited values (black line) as a function of the designed numerical aperture: $1.22\lambda/(2NA)$, where $NA \approx D/2f$ and D is the metamirror diameter, indicating that the device remains at diffraction limited operation under stretching ratios up to 20%.

For a more visible change in focal lengths, the longitudinal profiles of the focused light by the metamirror are reconstructed from images captured across the focal point. As shown in FIG. 5C (measured longitudinal beam intensity profiles of the metamirror for stretching ratios of 0 (top), 10% (middle) and 20% (bottom), where the metamirror is located at z=0 (left side of images)), the change in focal length along with the stretching ratio is clearly identified: the focal length of the relaxed metamirror is ~250 μm, and it gradually increases to ~304 μm and ~350 μm under a 10% and 20% isotropic, lateral stretching of the metamirror pattern. All extracted focal distances from experiment, as a function of the stretching ratio, are compared to the predicted values as shown in FIG. 5D (measured focal length (red dots) extracted from FIG. 5C and predicted focal lengths of the metamirror (black line) as a function of the stretching ratio, where the error bars show ranges of focal distance where the intensity is larger than 90% of the peak value), exhibiting good agreement. We find that the focal length can be restored continuously to its original value (relaxed metamirror) as the stretched PDMS film is released gradually. This confirms the tunability of the metamirror and its mechanical robustness which is essential for practical applications of reconfigurable optical components (see references 51, 52 cited below).

The focusing efficiency of the fabricated metamirror is also evaluated, as shown in FIG. 5E (measured focusing efficiencies of the metamirror as a function of the stretching ratio), as the ratio of focused optical intensity integrated within the focal plane to the incident optical power on the metamirror. A measured efficiency of 34% is obtained for a relaxed device, which decreases slightly to 31% and 29% for the stretching ratio of 10% and 20%, respectively. The slight decrease of focusing efficiency may reside in the small dependence of the reflection coefficient on the stretching ratio (i.e. element pitch changes under stretching) (see reference 51 cited below). The measured efficiencies (~30%) are lower than the numerical values (45%) shown in FIG. 2F. We attribute the difference between the experimental and simulated results to imperfections of both fabrication and testing. First, since the designed minimum separation between adjacent nanoantennae is small (30 nm), the fabrication imperfections may make separations between antennae even smaller. This effect leads to a stronger near field coupling between antennae and thus greater deviation of phase modulation from the imposed phase profile. Second, in the optical setup, four tweezers were employed to stretch the four corners of the flexible substrate. This configuration may cause the device surface to be slightly textured and not perfectly normal to the incident light beam. Meanwhile, the non-perfect uniform mechanical stretching may lead to the deformation and misalignment of elements. The above reasons together contribute to a decreased performance efficiency of the metamirror.

Tunable Reflective Metagrating Example

The following is a further example of a mechanically tunable metamirror in accordance with the present disclosure. In particular, the described device has the optical function of a diffraction grating with a tunable grating spacing.

Metagrating surfaces may be formed of a plurality of unit cells, wherein each unit cell includes a plurality of meta-atoms. The sizing and spacing of the meta-atoms at least partially determines the operating characteristics of the meta-grating. Meta-grating unit cells may be configured, e.g., as described in WO2016/161175, the disclosure of which is incorporated herein in its entirety by reference.

The number of tokens within a unit cell determines the number of steps in the stepwise linear phase response. For instance, for a period with three tokens there are three steps in the phase response across a single unit cell with the distances between the steps being $2\pi/3$. The main degrees-of-freedom to achieve the desired stepwise linear phase response in a metagrating are the x and y dimensions of each token within the unit cell as well as the thicknesses of the metal and dielectric layers.

Figure 6:
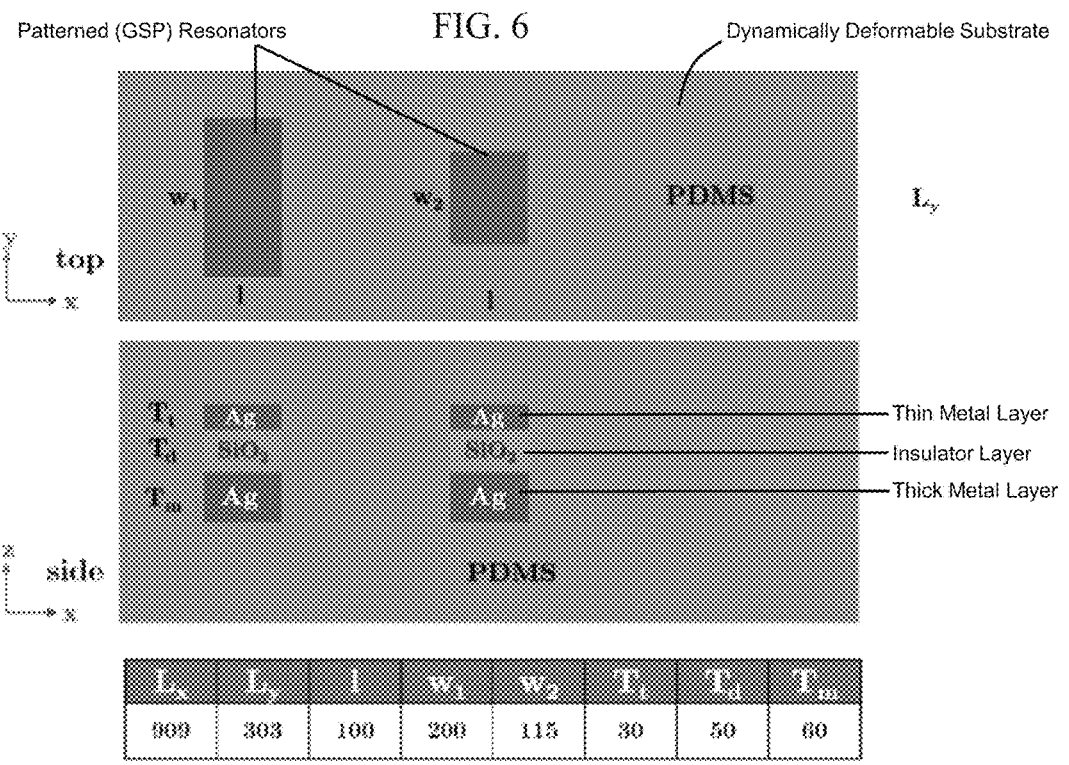
FIG. 6 schematically illustrates the structure of the unit cell geometry of a tunable reflective metagrating comprising differently sized patterned isolated gap surface plasmon (GSP) resonator meta-atoms encapsulated in PDMS used in an embodiment of the disclosure.

FIG. 6 shows an example tunable metagrating metamirror device. Metal-dielectric GSP resonator stacks with sub-wavelength dimensions are fabricated embedded in a flexible substrate. An incoming illumination of the design wavelength interacts with the subwavelength sized stacks that shape the reflecting wavefront. By changing the local dimensions of the stacks an arbitrary optical function in reflection can be achieved. The process of finding the required local geometry is similar to the one described in the above tunable reflective metalens example, as is an appropriate fabrication process. In particular, the stacks dimensions may be chosen such that their phase response approximates a linear phase ramp to fulfill the diffraction grating functionality.

As shown in FIG. 6, e.g., a set of three token regions may be chosen to approximate a linear phase ramp from $-\pi$ to $\pi$ across each unit cell of a structure. We observed that we can further remove the actual third token (when it has very small dimensions) while maintaining similar efficiency response resulting in even simpler two token design (the "empty" token region still serves its purpose as part of the linear phase ramp giving a relative phase response of zero). This is particularly beneficial for fabrication purposes. Final exemplary token dimensions for a metagrating with a targeted design wavelength of 633 nm are shown in FIG. 6.

It should be noted that there are various sets of three tokens that can provide a linear phase across the structure with a high efficiency for normal angle of incidence (AOI). In our workflow we first choose a set of three tokens approximating a linear phase based on the parameter sweep of a single token at normal AOI. We then model the complete unit cell using those three tokens for various AOIs. If the efficiency response as a function of AOI isn't flat enough we choose another set of three tokens and reiterate the process until the final design is achieved.

Figure 7:
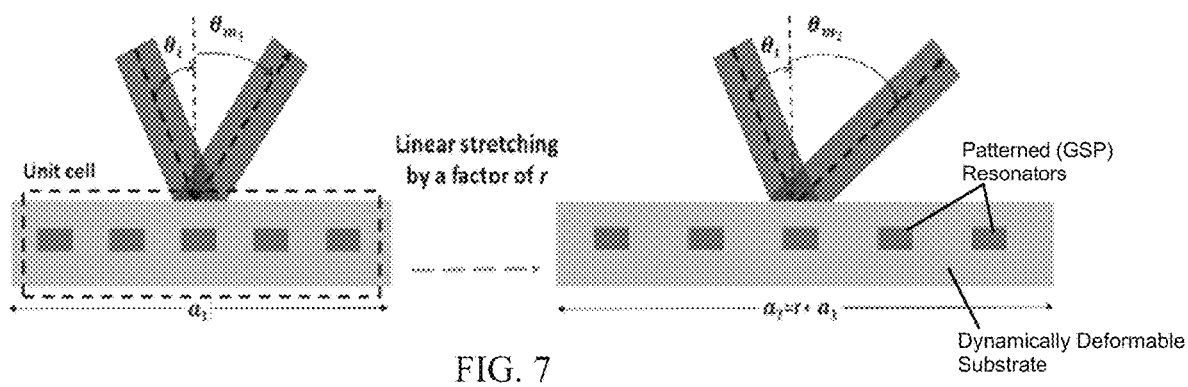
FIG. 7 schematically illustrates the working principle of the mechanically tunable reflective metagrating of FIG. 6.

FIG. 7 demonstrates the tunability of the metagrating device. The metal-dielectric stacks are small enough that when the flexible substrate is stretched the stacks integrity is preserved. By applying an external mechanical force to the stretchable substrate (such as described above in the tunable reflective metalens example), the distance between the stacks can be continuously increased, which in turn changes the grating spacing of the device. By varying the grating spacing in this fashion, the reflected light can be directed in any desired direction over a certain range (determined by the maximum stretch ratio). In the illustrated embodiment, e.g., while the unstretched metagrating reflects light at a reflected angle $\theta_{m1}$ for light incoming at an angle of incidence (AOI) $\theta_i$, when the metagrating is stretched by a factor r it then reflects light at a new reflected angle $\theta_{m2}$ for incoming light at the same AOI $\theta_i$ due to the change in distance between the stacks. The device can be brought to its initial relaxed state by releasing the external mechanical force. The reflected wavefront can be thus directed dynamically.

Based on use of highly-reflective GSP resonators employing an optically thin patterned metal top layer and an optically thick patterned metal base layer separated by a patterned insulator layer, the above metalens and metagrating examples demonstrate reflection type, mechanically tunable, ultrathin flat metasurface devices capable of dynamically modifying the wavefront of reflected light. The focal length and or angle of reflection of the demonstrated metamirrors can be changed significantly and seamlessly by simply stretching the encapsulating polymer film, which also adds the mechanical and chemical robustness to the device. Although each of the demonstrated tunable metamirrors is designed to work at a targeted design wavelength in the visible range, functioning realms for such tunable metamirrors can be extended to a much broader frequency range (telecom or infrared) by scaling the geometry and choosing proper materials for unit elements. Improvements of the metamirror such as chromatic aberration corrections can be applied, e.g., by combining the current platform with dispersive phase compensation strategy (see references 24, 25, 61, 62 cited below) or the spatial multiplexing scheme (see references 20, 63, 64 cited below). Furthermore, the optical function of the metamirrors is not limited to light steering and focusing. More complex properties can be achieved by changing the dimensions or constituent materials of the subwavelength features. These properties can be then dynamically tuned by applying a mechanical deformation to the device's substrate. Reflection type, reconfigurable systems may be designed for a variety of applications such as flat optics, optical communications and wearable consumer electronics.

REFERENCES cited above, the disclosures of which are herein incorporated by reference:
1. Yu, N.; Capasso, F. *Nat. Mater.* 2014, 13, (2), 139-150.
2. Meinzer, N.; Barnes, W. L.; Hooper, I. R. *Nat. Photon.* 2014, 8, (12), 889-898.
3. Zhang, L.; Mei, S.; Huang, K.; Qiu, C.-W. *Adv. Optical Mater.* 2016, 4, (6), 818-833.
4. Kildishev, A. V.; Boltasseva, A.; Shalaev, V. M. *Science* 2013, 339, (6125), 1232009.
5. Cheng, F.; Gao, J.; Luk, T. S.; Yang, X. *Sci. Rep.* 2015, 5.
6. Yu, N.; Genevet, P.; Kats, M. A.; Aieta, F.; Tetienne, J.-P.; Capasso, F.; Gaburro, Z. *Science* 2011, 334, (6054), 333-337.
7. Pfeiffer, C.; Emani, N. K.; Shaltout, A. M.; Boltasseva, A.; Shalaev, V. M.; Grbic, A. *Nano Lett.* 2014, 14, (5), 2491-2497.
8. Nikolov, D. K.; Cheng, F.; Basaran, N.; Bauer, A.; Rolland, J. P.; Vamivakas, A. N. *Opt. Mater. Express* 2018, 8, (8), 2125-2130.
9. Yu, N.; Aieta, F.; Genevet, P.; Kats, M. A.; Gaburro, Z.; Capasso, F. *Nano Lett.* 2012, 12, (12), 6328-6333.
10. Pors, A.; Nielsen, M. G.; Bozhevolnyi, S. I. *Opt. Lett.* 2013, 38, (4), 513-515.
11. Huang, L.; Chen, X.; Mühlenbemd, H.; Li, G.; Bai, B.; Tan, Q.; Jin, G.; Zentgraf, T.; Zhang, S. *Nano Lett* 2012, 12, (11), 5750-5755.
12. Ma, X.; Pu, M.; Li, X.; Huang, C.; Wang, Y.; Pan, W.; Zhao, B.; Cui, J.; Wang, C.; Zhao, Z.; Luo, X. *Sci. Rep.* 2015, 5, 10365.
13. Ni, X.; Kildishev, A. V.; Shalaev, V. M. *Nat. Commun.* 2013, 4, 2807.
14. Wen, D.; Yue, F.; Li, G.; Zheng, G.; Chan, K.; Chen, S.; Chen, M.; Li, K. F.; Wong, P. W. H.; Cheah, K. W.; Yue Bun Pun, E.; Zhang, S.; Chen, X. *Nat. Commun.* 2015, 6, 8241.
15. Zheng, G.; Mühlenbemd, H.; Kenney, M.; Li, G.; Zentgraf, T.; Zhang, S. *Nat. Nanotechnol.* 2015, 10, 308-312.
16. Cheng, F.; Ding, L.; Qiu, L.; Nikolov, D.; Bauer, A.; Rolland, J. P.; Vamivakas, A. N. *Opt. Express.* 2018, 26, (23), 30678-30688.
17. Arbabi, A.; Hone, Y.; Bagheri, M.; Faraon, A. *Nat. Nanotechnol.* 2015, 10, 937-943.
18. Chen, W. T.; Zhu, A. Y.; Sanjeev, V.; Khorasaninejad, M.; Shi, Z.; Lee, E.; Capasso, F. *Nat Nanotechnol* 2018, 13, (3), 220-226.
19. Bao, Y.; Jiang, Q.; Kang, Y.; Zhu, X.; Fang, Z. *Light: Science &Amp; Applications* 2017, 6, e17071.
20. Chen, B. H.; Wu, P. C.; Su, V.-C.; Lai, Y.-C.; Chu, C. H.; Lee, I. C.; Chen, J.-W.; Chen, Y. H.; Lan, Y.-C.; Kuan, C.-H.; Tsai, D. P. *Nano Lett* 2017, 17, (10), 6345-6352.
21. Boroviks, S.; Deshpande, R. A.; Mortensen, N. A.; Bozhevolnyi, S. I. *ACS Photo.* 2018, 5, (5), 1648-1653.
22. Paniagua-Dominguez, R.; Yu, Y. F.; Khaidarov, E.; Choi, S.; Leong, V.; Bakker, R. M.; Liang, X.; Fu, Y. H.; Valuckas, V.; Krivitsky, L. A.; Kuznetsov, A. I. *Nano Lett.* 2018, 18, (3), 2124-2132.
23. Liang, H.; Lin, Q.; Xie, X.; Sun, Q.; Wang, Y.; Zhou, L.; Liu, L.; Yu, X.; Zhou, J.; Krauss, T. F.; Li, J. *Nano Lett.* 2018, 18, (7), 4460-4466.
24. Chen, W. T.; Zhu, A. Y.; Sanjeev, V.; Khorasaninejad, M.; Shi, Z.; Lee, E.; Capasso, F. *Nat. Nanotechnol.* 2018, 13, (3), 220-226.
25. Wang, S.; Wu, P. C.; Su, V.-C.; Lai, Y.-C.; Chen, M.-K.; Kuo, H. Y.; Chen, B. H.; Chen, Y. H.; Huang, T.-T.; Wang, J.-H.; Lin, R.-M.; Kuan, C.-H.; Li, T.; Wang, Z.; Zhu, S.; Tsai, D. P. *Nat. Nanotechnol.* 2018, 13, (3), 227-232.
26. Zhang, Z.; Wen, D.; Zhang, C.; Chen, M.; Wang, W.; Chen, S.; Chen, X. *ACS Photo.* 2018, 5, (5), 1794-1799.
27. Pryce, I. M.; Aydin, K.; Kelaita, Y. A.; Briggs, R. M.; Atwater, H. A. *Nano Lett.* 2010, 10, (10), 4222-4227.
28. Gutruf, P.; Zou, C.; Withayachumnankul, W.; Bhaskaran, M.; Sriram, S.; Fumeaux, C. *ACS Nano* 2016, 10, (1), 133-141.
29. Lewi, T.; Evans, H. A.; Butakov, N. A.; Schuller, J. A. *Nano Lett.* 2017, 17, (6), 3940-3945.
30. Karvounis, A.; Gholipour, B.; MacDonald, K. F.; Zheludev, N. I. *Appl. Phys. Lett.* 2016, 109, (5), 051103.
31. Sautter, J.; Staude, I.; Decker, M.; Rusak, E.; Neshev, D. N.; Brener, I.; Kivshar, Y. S. *ACS Nano* 2015, 9, (4), 4308-4315.
32. Komar, A.; Fang, Z.; Bohn, J.; Sautter, J.; Decker, M.; Miroshnichenko, A.; Pertsch, T.; Brener, I.; Kivshar, Y. S.; Staude, I.; Neshev, D. N. *Appl. Phys. Lett.* 2017, 110, (7), 071109.
33. Parry, M.; Komar, A.; Hopkins, B.; Campione, S.; Liu, S.; Miroshnichenko, A. E.; Nogan, J.; Sinclair, M. B.; Brener, I.; Neshev, D. N. *Appl. Phys. Lett.* 2017, 111, (5), 053102.
34. Aksu, S.; Huang, M.; Artar, A.; Yanik, A. A.; Selvarasah, S.; Dokmeci, M. R.; Altug, H. *Adv. Mater.* 2011, 23, (38), 4422-4430.
35. Tseng, M. L.; Yang, J.; Semmlinger, M.; Zhang, C.; Nordlander, P.; Halas, N. J. *Nano Lett* 2017, 17, (10), 6034-6039.
36. Kocer, H.; Butun, S.; Palacios, E.; Liu, Z.; Tongay, S.; Fu, D.; Wang, K.; Wu, J.; Aydin, K. *Sci. Rep.* 2015, 5, 13384.
37. Kocer, H.; Butun, S.; Banar, B.; Wang, K.; Tongay, S.; Wu, J.; Aydin, K. *Appl. Phys. Lett.* 2015, 106, (16), 161104.
38. Ou, J. Y.; Plum, E.; Zhang, J.; Zheludev, N. I. *Nat Nanotechnol* 2013, 8, (4), 252-5.
39. Yao, Y.; Shankar, R.; Kats, M. A.; Song, Y.; Kong, J.; Loncar, M.; Capasso, F. *Nano Lett* 2014, 14, (11), 6526-6532.
40. Sun, T.; Kim, J.; Yuk, J. M.; Zettl, A.; Wang, F.; Chang-hasnain, C. *Opt. Express.* 2016, 24, (23), 26035-26043.
41. Huang, Y.-W.; Lee, H. W. H.; Sokhoyan, R.; Pala, R. A.; Thyagarajan, K.; Han, S.; Tsai, D. P.; Atwater, H. A. *Nano Lett* 2016, 16, (9), 5319-5325.

42. Komar, A.; Paniagua-Dominguez, R.; Miroshnichenko, A.; Yu, Y. F.; Kivshar, Y. S.; Kuznetsov, A. I.; Neshev, D. *ACS Photo.* 2018, 5, (5), 1742-1748.
43. Iyer, P. P.; Pendharkar, M.; Schuller, J. A. *Adv. Optical Mater.* 2016, 4, (10), 1582-1588.
44. Rahmani, M.; Xu, L.; Miroshnichenko, A. E.; Komar, A.; Camacho-Morales, R.; Chen, H.; Zarate, Y.; Kruk, S.; Zhang, G.; Neshev, D. N.; Kivshar, Y. S. *Adv. Funct. Mater.* 2017, 27, (31), 1700580.
45. Malek, S. C.; Ee, H.-S.; Agarwal, R. *Nano Lett.* 2017, 17, (6), 3641-3645.
46. Wang, Q.; Rogers, E. T. F.; Gholipour, B.; Wang, C.-M.; Yuan, G.; Teng, J.; Zheludev, N. I. *Nature Photonics* 2015, 10, 60.
47. Arbabi, E.; Arbabi, A.; Kamali, S. M.; Hone, Y.; Faraji-Dana, M.; Faraon, A. *Nat. Commun.* 2018, 9, (1), 812.
48. She, A.; Zhang, S.; Shian, S.; Clarke, D. R.; Capasso, F. *Science Advances* 2018, 4, (2).
49. Afridi, A.; Canet-Ferrer, J.; Philippet, L.; Osmond, J.; Berto, P.; Quidant, R. *ACS Photo.* 2018, 5, (11), 4497-4503.
50. Chen, Y.; Li, X.; Sonnefraud, Y.; Fernandez-Dominguez, A. I.; Luo, X.; Hong, M.; Maier, S. A. *Sci. Rep.* 2015, 5, 8660.
51. Kamali, S. M.; Arbabi, E.; Arbabi, A.; Hone, Y.; Faraon, A. *Laser. Photon. Rev.* 2016, 10, (6), 1002-1008.
52. Ee, H.-S.; Agarwal, R. *Nano Lett* 2016, 16, (4), 2818-2823.
53. Liu, C. H.; Zheng, J.; Colburn, S.; Fryett, T. K.; Chen, Y.; Xu, X.; Majumdar, A. *Nano Lett* 2018, 18, (11), 6961-6966.
54. Colburn, S.; Zhan, A.; Majumdar, A. *Optica* 2018, 5, (7), 825-831.
55. Roy, T.; Zhang, S.; Jung, I. W.; Troccoli, M.; Capasso, F.; Lopez, D. *APL Photonics* 2018, 3, (2), 021302.
56. Pors, A.; Albrektsen, O.; Radko, I. P.; Bozhevolnyi, S. I. *Sci. Rep.* 2013, 3, 2155.
57. Aieta, F.; Genevet, P.; Kats, M. A.; Yu, N.; Blanchard, R.; Gaburro, Z.; Capasso, F. *Nano Lett.* 2012, 12, (9), 4932-4936.
58. Goodman, J. W., *Introduction to Fourier Optics*. McGraw-Hill: 1996.
59. Yang, H.; Jin, A.; Luo, Q.; Li, J.; Gu, C.; Cui, Z. *Microelectronic Engineering* 2008, 85, (5), 814-817.
60. Pors, A.; Nielsen, M. G.; Eriksen, R. L.; Bozhevolnyi, S. I. *Nano Lett* 2013, 13, (2), 829-834.
61. Aieta, F.; Kats, M. A.; Genevet, P.; Capasso, F. *Science* 2015, 347, (6228), 1342-1345.
62. Wang, S.; Wu, P. C.; Su, V.-C.; Lai, Y.-C.; Hung Chu, C.; Chen, J.-W.; Lu, S.-H.; Chen, J.; Xu, B.; Kuan, C.-H.; Li, T.; Zhu, S.; Tsai, D. P. *Nat. Commun.* 2017, 8, (1), 187.
63. Arbabi, E.; Arbabi, A.; Kamali, S. M.; Hone, Y.; Faraon, A. *Sci. Rep.* 2016, 6, 32803.
64. Arbabi, E.; Arbabi, A.; Kamali, S. M.; Hone, Y.; Faraon, A. *Optica* 2016, 3, (6), 628-633.

The invention claimed is:

1. A mechanically tunable reflective metamirror optical device configured for a targeted design optical wavelength comprising:
    a dynamically deformable substrate; and
    a sub-wavelength periodic arrangement of patterned isolated gap surface plasmon (GSP) resonators positioned in or on the dynamically deformable substrate, wherein the patterned isolated GSP resonators are movable relative to each other and comprise a patterned optically thin metal layer for the design wavelength, a patterned optically thick metal layer for the design wavelength, and a patterned insulator layer between the patterned optically thin and optically thick metal layers.

2. The mechanically tunable reflective metamirror optical device of claim 1, wherein the dynamically deformable substrate is a mechanically stretchable substrate.

3. The mechanically tunable reflective metamirror optical device of claim 2, wherein the mechanically stretchable substrate comprises polydimethylsiloxane (PDMS).

4. The mechanically tunable reflective metamirror optical device of claim 1, wherein the patterned isolated GSP resonators are encapsulated in the dynamically deformable substrate.

5. The mechanically tunable reflective metamirror optical device of claim 1, wherein the patterned optically thin metal layer and patterned optically thick metal layer comprise silver.

6. The mechanically tunable reflective metamirror optical device of claim 5, wherein the patterned optically thin metal layer has a thickness of less than 40 nm.

7. The mechanically tunable reflective metamirror optical device of claim 1, wherein the targeted design optical wavelength is in the range from 400-750 nm.

8. The mechanically tunable reflective metamirror optical device of claim 1, wherein the patterned insulator layer comprises $SiO_2$.

9. The mechanically tunable reflective metamirror optical device of claim 1, wherein the dynamically deformable substrate is a mechanically stretchable substrate;
    wherein the mechanically stretchable substrate comprises polydimethylsiloxane (PDMS);
    wherein the patterned isolated GSP resonators are encapsulated in the dynamically deformable substrate;
    wherein the patterned optically thin metal layer and patterned optically thick metal layer comprise silver;
    wherein the patterned optically thin metal layer has a thickness of less than 40 nm;
    wherein the targeted design optical wavelength is in the range from 400-750 nm;
    wherein the patterned insulator layer comprises $SiO_2$.

10. The mechanically tunable reflective metamirror optical device of claim 9, wherein the periodic arrangement of patterned isolated gap surface plasmon (GSP) resonators and dynamically deformable substrate form a tunable reflective metalens.

11. The mechanically tunable reflective metamirror optical device of claim 9, wherein the periodic arrangement of patterned isolated gap surface plasmon (GSP) resonators and dynamically deformable substrate form a tunable reflective meta-grating.

12. The mechanically tunable reflective metamirror optical device of claim 11, wherein the meta-grating is at least partially defined by unit cells having a plurality of meta-atoms.

13. The mechanically tunable reflective metamirror optical device of claim 12, wherein the unit cells include at least three meta-atoms.

14. The mechanically tunable reflective metamirror optical device of claim 13, wherein at least two of the meta-atoms in a unit cell have different length to width ratios.

15. The mechanically tunable reflective metamirror optical device of claim 12, wherein at least two of the meta-atoms in a unit cell have different length to width ratios.

16. The mechanically tunable reflective metamirror optical device of claim 1, wherein the periodic arrangement of patterned isolated gap surface plasmon (GSP) resonators and dynamically deformable substrate form a tunable reflective metalens.

17. The mechanically tunable reflective metamirror optical device of claim 1, wherein the periodic arrangement of patterned isolated gap surface plasmon (GSP) resonators and dynamically deformable substrate form a tunable reflective meta-grating.

18. The mechanically tunable reflective metamirror optical device of claim 17, wherein the meta-grating is at least partially defined by unit cells having a plurality of meta-atoms.

19. The mechanically tunable reflective metamirror optical device of claim 18, wherein at least two of the meta-atoms in a unit cell have different length to width ratios.

20. The mechanically tunable reflective metamirror optical device of claim 18, wherein the unit cells include at least three meta-atoms.

* * * * *